Jan. 24, 1956    H. E. SLOAN ET AL    2,732,216
INDEXING-TYPE CHUCK

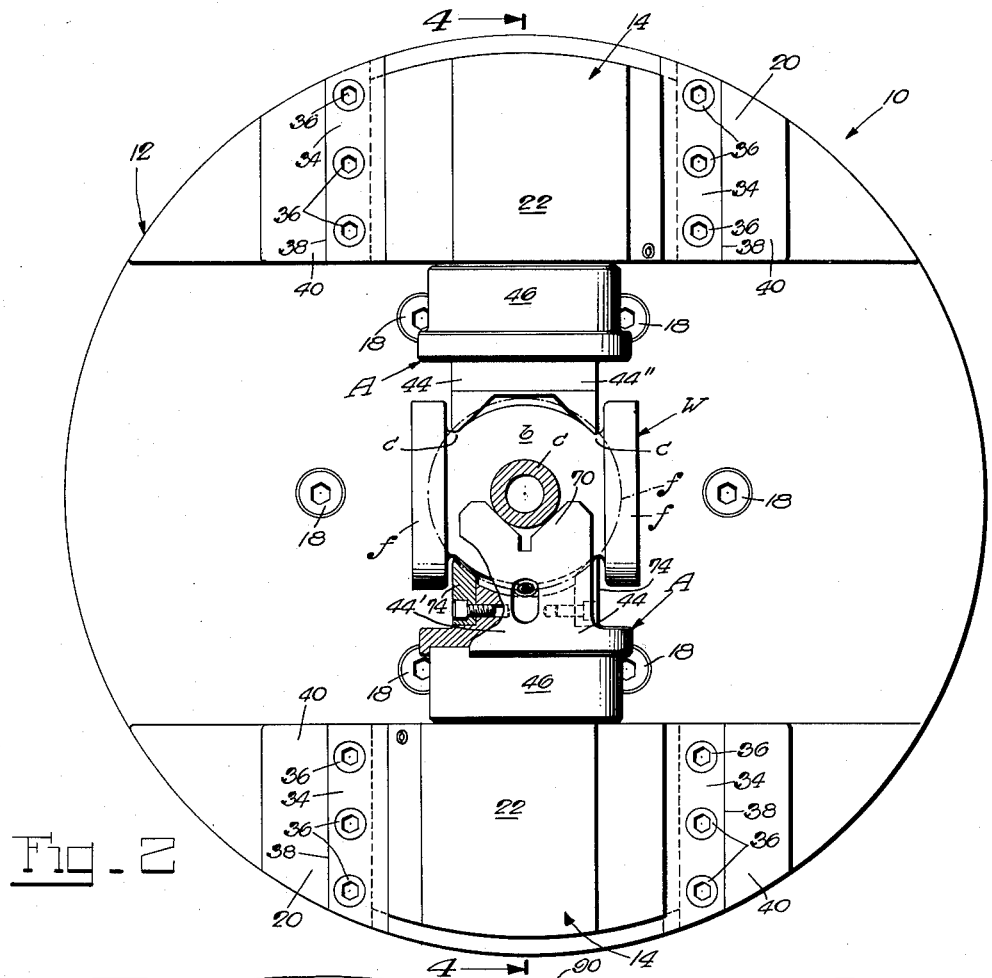

Filed June 8, 1953    4 Sheets-Sheet 1

Inventors:
Harry E. Sloan
Jerome J. Rutherford
and Herbert W. Hickey
by: Stewart & Sprengel
Attorneys.

Jan. 24, 1956  H. E. SLOAN ET AL  2,732,216
INDEXING-TYPE CHUCK
Filed June 8, 1953  4 Sheets—Sheet 4
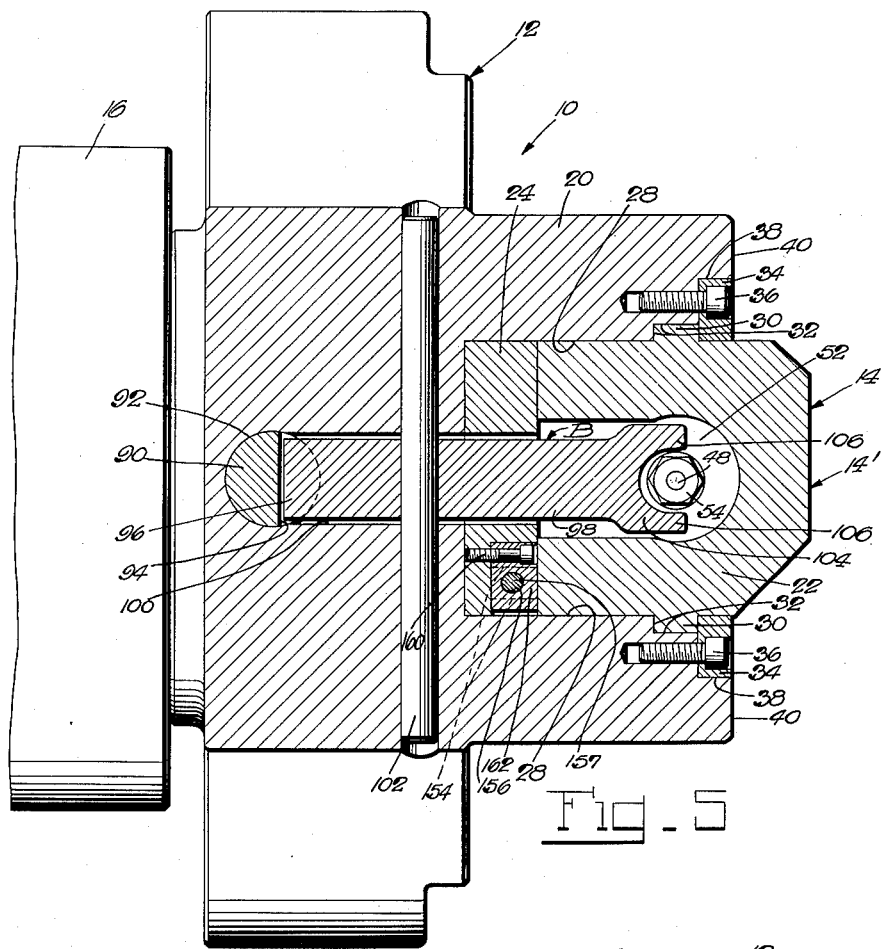
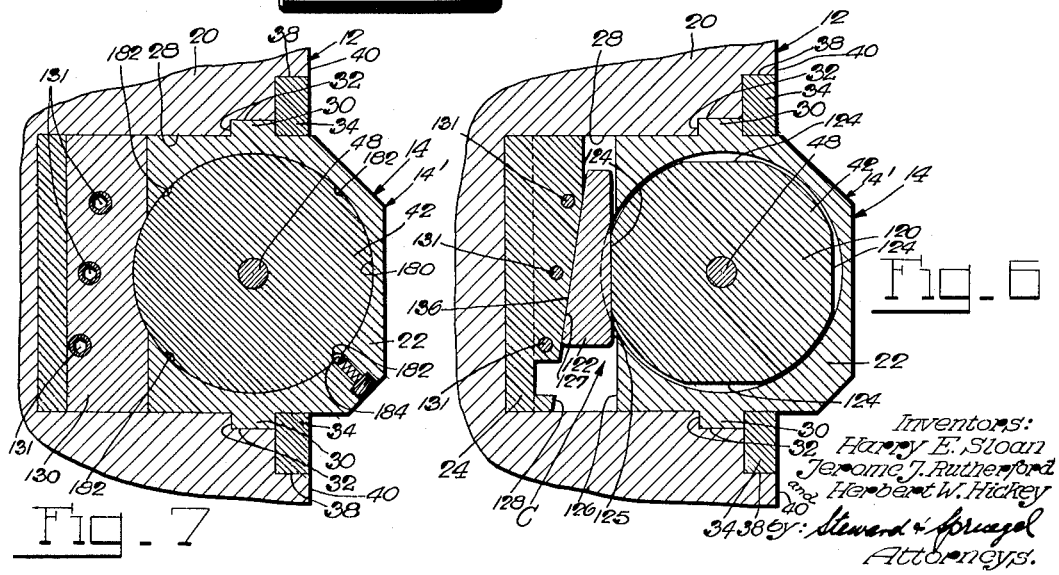
Inventors:
Harry E. Sloan
Jerome J. Rutherford
and Herbert W. Hickey
By: Steward & Sprigel
Attorneys.

United States Patent Office 2,732,216
Patented Jan. 24, 1956

2,732,216

INDEXING-TYPE CHUCK

Harry E. Sloan, Hartford, Jerome J. Rutherford, Windsor, and Herbert W. Hickey, Hartford, Conn., assignors to The Cushman Chuck Company, Hartford, Conn., a corporation of Connecticut Application June 8, 1953, Serial No. 360,136

12 Claims. (Cl. 279—5)

This invention relates to chucks in general, and to chucks of the indexing type in particular.

Chucks of this type are characterized by a pair of opposite work-gripping jaws which are rotatably mounted on jaw carriers that slide in the chuck body to bring the jaws into and from gripping engagement with work. Previous chucks of this type have a releasable mechanism on the chuck body for locking one of the jaws in any one of a number of predetermined angular operating positions, and the jaw carriers are customarily cylindrical and are held against rotation in the chuck body by pivoted operating arms the ends of which are received in the outer forked ends of the jaw carriers and operatively connected with the latter for moving the jaws into and from gripping engagement with work. While these previous chucks may be satisfactory for light duty performance, they are not satisfactory for heavy duty performance involving large work-clamping forces. Thus, although the jaws are rotatably supported in their respective carriers, turning of the jaws with firmly gripped heavy work into different operating positions will nevertheless induce in the carriers some torsional stresses which are solely resisted by the operating arms, with the result that the ends of these operating arms are subjected to early and excessive wear and the pivots of the latter are subjected to unfavorable bending stresses. Further, since the jaw-locking mechanism in previous chucks of this type is carried by the chuck body and, hence, is immovable with the associated jaw, this mechanism, if normally interlocking with the associated jaw with the firmness required for holding gripped work, and especially heavier work, accurately positioned while being operated upon, will have to be released from interlock with the associated jaw every time the latter is moved into and from gripping engagement with work, in order to prevent early and prohibitive frictional wear of both, the locking mechanism and the associated jaw. While the release of the arrested jaw from the locking mechanism in previous chucks of this type for each movement of the jaws into and from gripping engagement with work is imperative to prevent early and prohibitive wear of the locking mechanism and associated jaw, as mentioned, it is highly objectionable insofar as the efficiency of operation of these chucks is concerned.

It is an object of the present invention to provide a chuck of this type of which none of the movable parts of the jaw-operating mechanism is subjected to any stress due to the indexing of the jaws and gripped work therebetween regardless of the magnitude of the force with which the work is gripped.

It is another object of the present invention to provide in the body of a chuck of this type guideways in which the jaw carriers are slidably but non-rotatably received, so that the chuck body, rather than any of the movable parts of the jaw-operating mechanism, will resist any turning tendencies of the jaw carriers when the jaws thereon with the gripped work therebetween are indexed into different operating positions.

It is a further object of the present invention to have provisions in a chuck of this type for releasably locking at least one of the jaws in any one of its predetermined operating positions to its carrier, rather than to the chuck body as in previous chucks of this type, thereby to permit movement of the jaws into and from gripping engagement with work without requiring release of the arrested jaw from the locking mechanism.

It is another object of the present invention to provide a chuck of this type of which the aforementioned jaw-locking provisions comprise a locking disc on the arresting jaw which is provided on its periphery with prominent flats that are equal in number to, and have the same relative angular disposition as, the angularly displaced portions of a work-piece to be operated upon in the chuck, and a latch element in the form of a wedge which is interposed between the jaw carrier and disc and movable, by means of a readily accessible feed screw on the jaw carrier, into and from firm locking engagement with any one of the flats on the disc periphery to arrest the associated jaw in any of its predetermined angular operating positions.

Another object of the present invention is to provide a chuck of this type of which the aforementioned locking disc on the arresting jaw is journalled with its periphery in the associated jaw carrier, so that the considerable locking force exerted by the aforementioned wedge against the locked disc is taken up harmlessly by the jaw carrier and sets up no stresses in the journal support of the jaw.

Further objects and advantages will appear to those skilled in the art from the following, considered in conjunction with the accompanying drawings.

In the accompanying drawings, in which certain modes of carrying out the present invention are shown for illustrative purposes:

Fig. 2 is a front elevation, partly in section, of the chuck as viewed in the direction of the arrow 2 in Fig. 1;

Fig. 3 is a fragmentary top view of the chuck;

Fig. 5 is a section through the chuck as taken on the line 5—5 of Fig. 1;

Figure 1:
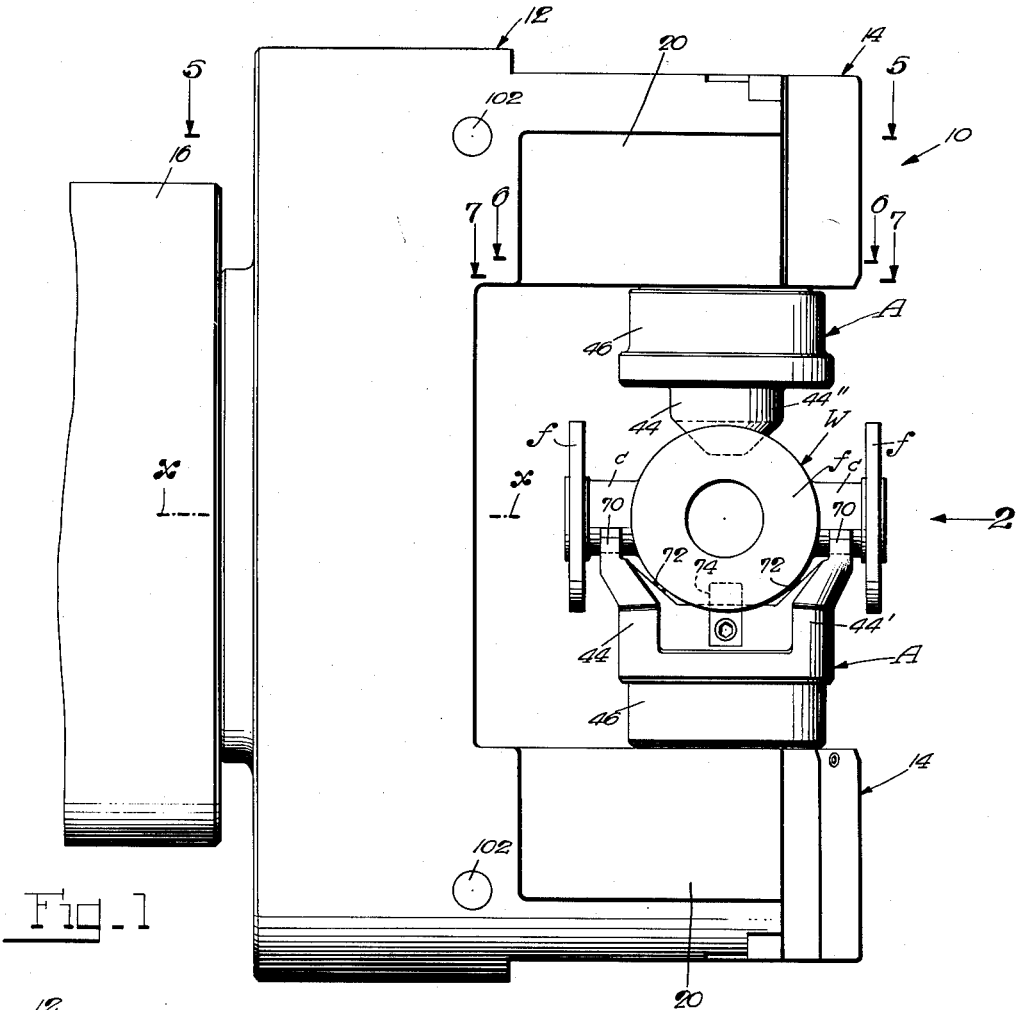
Fig. 1 is a side view of a chuck embodying the present invention.
Figure 8:
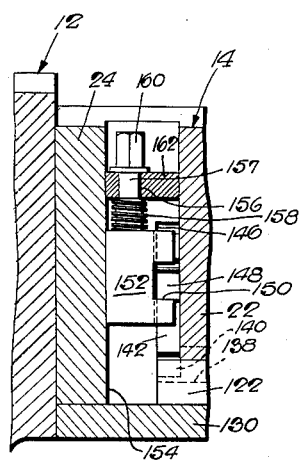
Figure 9:
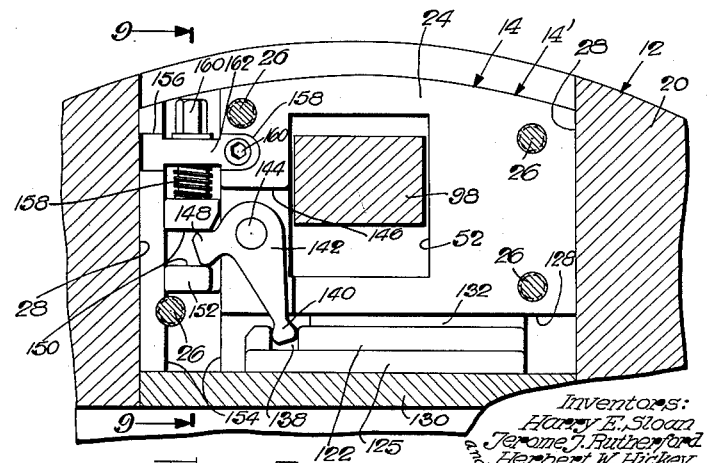
Figure 4:
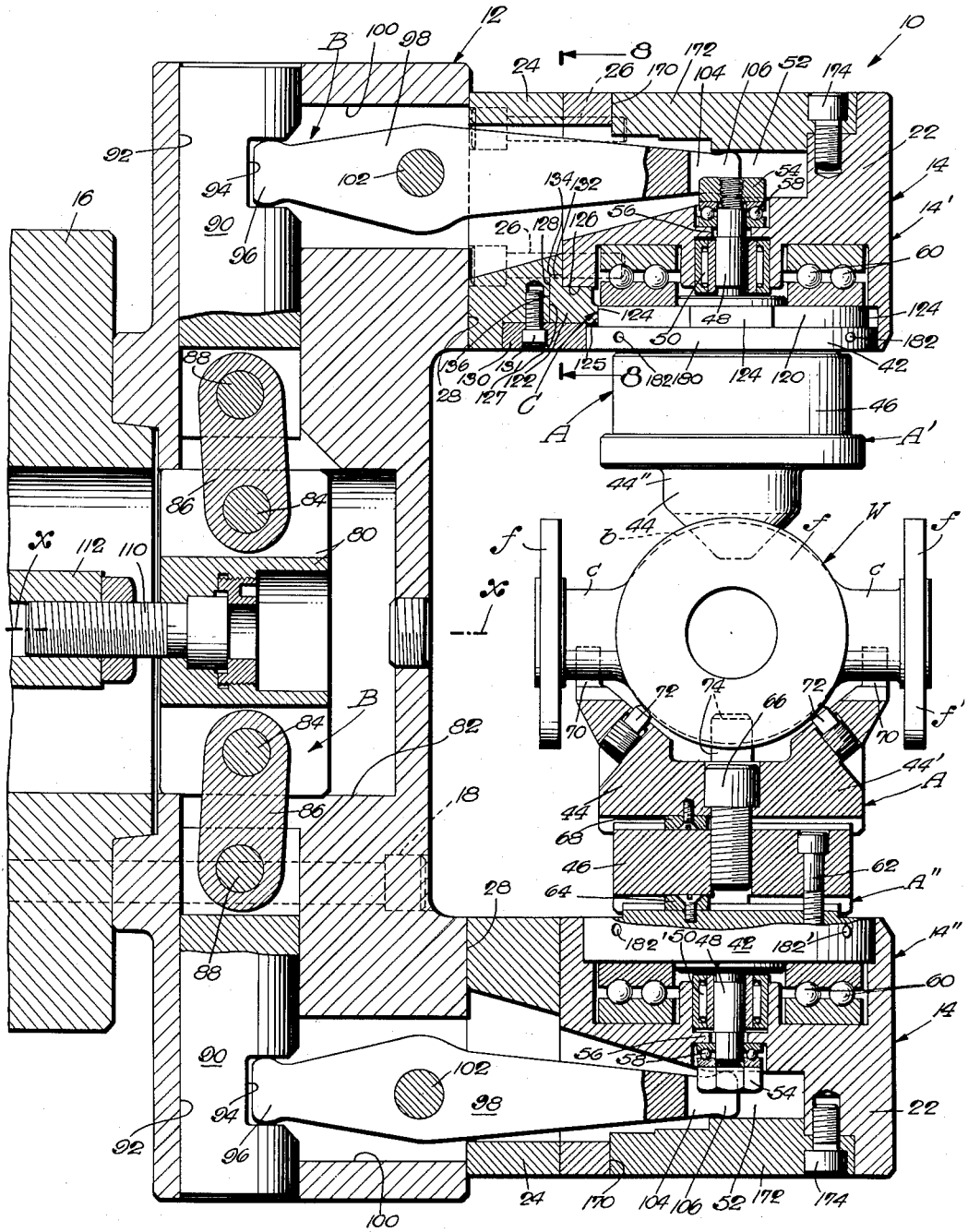
Fig. 4 is an enlarged section through the chuck, taken substantially on the line 4—4 of Fig. 2.

Figs. 6 and 7 are fragmentary sections through the chuck as taken on the lines 6—6 and 7—7, respectively, of Fig. 1;

Fig. 8 is a fragmentary section through the chuck as taken on the line 8—8 of Fig. 4; and Fig. 9 is a fragmentary section taken on the line 9—9 of Fig. 8.

Referring to the drawings, and more particularly to Figs. 1 to 4 thereof, the reference numeral 10 designates a chuck having a body 12 which carries the various operating parts and mechanisms of the chuck, such as opposite jaw carriers 14, indexing jaw units A, jaw-operating mechanism B (Fig. 4), and jaw-arresting mechanism C (Figs. 4 and 6). The chuck body 12, which may removably be mounted on the power spindle 16, for instance, of a lathe or other machine tool by bolts 18 (Figs. 2 and 4), has a longitudinal axis x—x and is provided, in the present instance, with diametrically opposite lug projections 20.

Jaw carriers 14

For reasons which will appear obvious hereinafter, each jaw carrier 14 is preferably formed by two complemental sections 22 and 24 (Figs. 4 and 5) which are conveniently bolted together as at 26 (see also Fig. 8). The major parts of the carriers 14 are received in relatively deep machined radial slots 28 in the lug extensions 20, respectively, on the chuck body 12 (Fig. 5), and each carrier 14 is provided on its opposite sides with ribs 30 which are received with a sliding fit in a radial guideway 32 formed by machined recesses in the opposite walls of the respective slot 28. Each carrier 14 is retained in its guideway 32 by gibs 34 which are removably mounted, by bolts 36, for instance, in machined recesses 38 in the end face 40 of the respective lug extension 20 on the chuck body 12. The carriers 14 are thus movable in their respective guideways 32 toward and away from each other radially of the chuck body 12.

Indexing jaw units A

Each of the indexing jaw units A comprises a rotary base or disc 42 which carries a work-gripping jaw 44, in this instance preferably through intermediation of an adapter disc 46 (Fig. 4). Each base 42 has a shank 48 of which an intermediate length is journalled in an anti-friction bearing 50 in the respective carrier 14, and an end length thereof extends into a socket-like opening 52 in said carrier and threadedly receives a nut 54 (Figs. 4 and 5). Interposed between the nut 54 and an annular shoulder 56 in each carrier 14 is a thrust-type anti-friction bearing 58. A major thrust bearing 60, preferably of anti-friction type, is interposed between the base 42 of each jaw unit A and its respective carrier 14.

The adapter disc 46 of each jaw unit A is removably mounted on the adjacent base 42 by a plurality of bolts 62, and is preferably also keyed thereto as at 64 to protect the bolts 62 from torsional stress (Fig. 4).

The jaw 44 of each unit A is, in the present instance, centrally bolted at 66 to its adapter disc 46, and is preferably also keyed thereto as at 68 (Fig. 4). The work-gripping provisions of the jaws 44 are, in the present instance, different due to the nature of the exemplary work W shown in the drawings. The work W is in this instance a cast valve casing or cross-type fitting having a central oval-like body portion $b$ with four outward branches $c$ which terminate in flanges $f$ that require machining. Thus, the jaw 44', for instance, is arranged to perform the major part of the function of locating the work. To this end, jaw 44' is provided with opposite V-shaped work rests 70 (Figs. 1, 2 and 4) in which the work is supported with two of its opposite branches $c$, and is further provided with transverse pairs of work supports or locaters 72 and 74, respectively, which locate the work in the correct operating position longitudinally of the chuck body 12. The gripping face of the other jaw 44'' is shaped as indicated in Fig. 2 and engages the work W in such wise as to fix or locate the plane in which the axes of the branches $c$ of the work lie relative to the chuck body 12. It is to be understood, of course, that the work-locating provisions on the present jaws are merely exemplary, and that they may be made different for different types of work to be gripped.

Jaw-operating mechanism B

The mechanism B for operating or moving both jaws 44 into and from gripping engagement with work W comprises a common actuator 80 which is slidable in a central annular recess 82 in the rear of the chuck body 12 (Fig. 4) and is pivotally connected at 84 with toggle links 86 which are also pivotally connected at 88 with operating plungers 90, respectively, that are slidably received in diametrically opposite machined bores 92 in the chuck body 12. Each operating plunger 90 is intermediate its length recessed as at 94 to receive the inner end 96 of an operating lever 98. The operating levers 98 extend through openings 100 in the chuck body 12 into the socket-like openings 52 in the adjacent jaw carriers 14 (Figs. 4 and 5) and are mounted on pivots 102 in the chuck body. Each operating lever 98 terminates at its outer end in a fork 104 the prongs 106 of which flank the nut 54 on the adjacent jaw unit A. The prongs 106 at the outer ends of the operating levers 98 engage the socket-like openings 52 in the associated carriers in places which lie substantially in a common plane in which the rotary axes of the jaw units A lie, so that the vectors of the work-gripping forces transmitted by the operating levers 98 to the jaws 44 are in substantial alignment with the rotary axes of the latter.

The common actuator 80 is releasably connected at 110 with a draw bar 112 which is reciprocable to bring the jaws 44 into and from gripping engagement with work W through intermediation of the common actuator 80, toggle links 86, operating plungers 90, operating levers 98, and jaw carriers 14.

Jaw-arresting mechanism C

The instant jaws 44, being of the indexing type, are adapted to be turned with the gripped work W into different predetermined angular positions in which to perform certain machining or other operations on the work. Thus, the exemplary work W shown in the drawings may require a certain machining operation or operations on each one of the flanges $f$ thereof when in the position indicated at $f'$ in Fig. 4. Accordingly, the jaws 44 of the chuck with the gripped work W therebetween are indexed repeatedly in order to bring the flanges $f$ progressively into the position $f'$ for a machining operation or operations thereat. The jaws 44 may be indexed manually or by suitable power means. In the present instance, the jaws 44 with the gripped work W are indexed manually by grasping the gripped work and turning it, the described journal and thrust bearing provisions for the jaw units A permitting this without undue effort on the part of a machine operator. After thus turning or indexing the jaws 44 with the gripped work W therebetween, at least one of the jaw units A will have to be locked to prevent rotation of the gripped work during the subsequent machining or other operation thereon. To this end, the jaw-arresting mechanism C is associated with one of the jaw units A, in this instance the jaw unit A' (Fig. 4).

The jaw-arresting mechanism C comprises a locking plate or disc 120 and a cooperating latch member 122 which is in the form of a wedge (Figs. 4 and 6). More particularly, the locking disc 120 is, in the present instance, formed by a diametrically reduced portion of the base disc 42 of the jaw unit A', and is provided in its periphery with prominent flats 124 which are equal in number to the angularly spaced portions to be machined of work and are angularly spaced from each other the same as these work portions. Since the exemplary work W disclosed in the drawings is to be machined at four equiangularly spaced places thereof, i. e. at the flanges $f$, the periphery of the locking disc 120 is in this instance provided with four equiangularly spaced flats 124 (Fig. 6).

In order to lock the jaw unit A' in any of its predetermined angular positions and release it for an indexing step, the wedge member 122 is movable with its surface 125 into and from engagement with any adjacent flat 124 on the locking disc 120. The wedge member 122 is received in complementary recesses 126 and 128 in the sections 22 and 24, respectively, of the carrier 14' for the jaw unit A', and is held therein by a retainer plate 130 which is bolted at 131 to the carrier section 24. The wedge member 122 has a projecting top rib 132 (Fig. 4) which is received in a guide groove 134 in the carrier 14' so as to guide the wedge member 122 with its surface 127 along the companion wedge surface 136 in the carrier section 24 for movement of the opposite wedge surface 125 into and from engagement with an adjacent flat 124 on the locking disc 120 (Fig. 6). The wedge member 122 is near one end thereof provided with a transverse groove 138 (Fig. 8) for operative connection with one arm 140 of a bell-crank lever 142 which is pivoted at 144 in a recess 146 in the carrier section 24. The other arm 148 of the bell-crank lever 142 is received in a transverse groove 150 in a slide 152 which is guided for longitudinal movement in a groove 154 in the carrier section 24 (Figs. 8 and 9). Received with its opposite ends in recesses 156 and 158 in the carrier section 24 and secured therein by a screw 160 is a member 162

(Figs. 5, 8 and 9) which extends across the groove 154 and has a hole 156 in which is rotatably received a reduced shank 157 of an operating screw 158. The operating screw 158 is threadedly received by the slide 152, and its shank 157 carries a head 160 which turns with the screw 158 and holds the same to the member 162 against axial movement, wherefore the slide 152 will be moved in its guide groove 154 when the screw 58 is turned. The head 160 of the operating screw 158 is preferably within the confines of the guide groove 154 in the carrier 14' and is accessible from the outside with a socket wrench or like tool with which to turn the operating screw 158. It follows from the preceding that the wedge member 122 will be moved into and from locking engagement with any adjacent flat 124 on the locking disc 120 when the operating screw 158 is turned in opposite directions.

The present construction of the chuck is advantageous in several respects. Thus, each carrier 14 with its indexing jaw may be assembled as a separate unit and installed in the chuck in immediate operative relation with the jaw-operating mechanism B by merely placing this unit into its guideway 32 in the chuck body so that the adjacent operating lever 98 will enter the socket 52 in the carrier, and then securing the corresponding gibs 34 to the chuck body. This same unit may as readily be removed from the chuck on merely removing the corresponding gibs 34 from the chuck body. To facilitate the assembly of each jaw unit A with its carrier 14 and also permit replacement of the former with a different jaw unit while the carrier is assembled with the chuck, each carrier 14 has an opening 170 (Fig. 4) to provide access to the socket 52 therein. The opening 170 in each carrier 14 is normally closed by a cover disc 172 which is bolted at 174 to the carrier (see also Fig. 3).

Due to the fact that the operating connections of the levers 98 with the respective carriers 14 are so arranged that the vectors of the work-gripping forces transmitted by the former to the latter extend within the confines and even centrally of the guideways 32 in which the carriers 14 are received (Fig. 5), the carriers 14 have no tendency to skew or tilt in their respective guideways, with the result that these carriers and their guideways show little wear even after a long period of time. Due to the further fact that the vectors of the work-gripping forces transmitted to the carriers 14 by the operating levers 98 are also in substantial alignment with the rotary axes of the jaw units A (Figs. 4 and 5), the journals of these jaw units and their journal bearings are not subjected to any stresses from the transmission of the work-clamping forces from the carriers 14 to the work-gripping jaws 44.

The releasable interlock with the carrier 14' of the jaw unit A' in any one of its predetermined angular positions permits movement of this carrier with its jaw unit into and from work-gripping position without requiring release of the jaw unit from the carrier. This is especially advantageous in that a workpiece is positively located immediately on closure of the jaws.

The arrangement of the jaw-arresting mechanism C in the form of the wedge member 122 and the prominent flats 124 in the periphery of the locking disc 120 makes for an exceptionally secure and accurate interlock of the jaw unit A' with its carrier 14' for a long time. Thus, the wedge member 122 and engaged flat 124 on the locking disc 120 affords an exceptionally secure and nevertheless releasable coupling between the jaw unit A' and its carrier 14' (Fig. 6). Further, the periphery 180 of the non-reduced portion of the base disc 42 of the jaw unit A' is directly journalled in the carrier 14' (Figs. 4 and 7), so that the considerable force exerted by the wedge member 122 against the locked disc 120 is taken up harmlessly by the carrier 14' and sets up no stresses in the journal of the base disc and in its journal bearing. To facilitate accurate indexing of the jaw unit A' especially by hand and stop the same in any one of its predetermined angular operating positions in which a flat 124 on the locking disc 120 is in operative alignment with the wedge member 122 (Fig. 6), the periphery 180 of the non-reduced portion of the base disc 42 of the jaw unit A' is provided with a number of shallow depressions 182, in this instance four, and the carrier 14' is provided with a spring-urged ball or detent 184 which registers with a depression 182 in any one of the predetermined angular operating positions of the jaw unit A' and yieldingly resists rotation of the latter from any of these positions (Fig. 7). In the present instance, also the periphery of the base disc 42 of the other jaw unit A" is provided with the same shallow depressions 182' (Fig. 4) to cooperate with a similar spring-urged ball or detent (not shown) in the carrier 14" for yieldingly arresting the jaw unit A" in any of its predetermined angular operating positions.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. In a chuck of the indexing type having rotary jaws mounted on non-rotatable carriers on a chuck body of which at least one carrier is movable toward and away from the other carrier, the combination of a disc journalled with its periphery in said one carrier and turnable with the associated jaw, said disc having in its periphery angularly spaced locking surfaces and similarly spaced shallow depressions; a latch element mounted in said one carrier for movement into and from engagement with any adjacent lock surface on said disc periphery for releasably arresting the jaw on said one carrier against rotation in any one of a number of predetermined angular positions; and a spring-urged detent in said one carrier adapted to register with any one of said depressions in said disc periphery in order yieldingly to resist rotation of the jaw on said one carrier from any one of said predetermined angular positions.

2. In a chuck of the indexing type having rotary jaws mounted on non-rotatable opposite carriers on a chuck body of which at least one carrier is movable toward and away from the other carrier, the combination of a disc turnable with the jaw on said one carrier and having in its periphery angularly spaced flats; and a wedge mounted on said one carrier for rectilinear movement into and from engagement with any adjacent flat in said disc periphery for releasably arresting the jaw on said one carrier against rotation in any one of a number of predetermined angular positions.

3. The combination in a chuck of the indexing type as set forth in claim 2, in which said disc is journalled with its periphery in said one carrier.

4. In a chuck of the indexing type having rotary jaws mounted on non-rotatable opposite carriers on a chuck body of which at least one carrier is movable toward and away from the other carrier, the combination of a disc in said one carrier turnable with the jaw thereon and having in its periphery angularly spaced flats; a wedge mounted in said one carrier for rectilinear movement into and from engagement with any adjacent flat in said disc periphery for releasably arresting the jaw on said one carrier against rotation in any one of a number of predetermined angular positions; and means within said one carrier and accessible for operation from the outside thereof for moving said wedge into and from engagement with any of said flats on said disc periphery.

5. In a chuck of the indexing type having rotary jaws mounted on non-rotatable opposite carriers on a chuck body of which at least one carrier is movable toward and away from the other carrier, the combination of a disc in said one carrier turnable with the jaw thereon and having in its periphery angularly spaced flats; a wedge mounted in said one carrier for rectilinear movement into and from engagement with any adjacent flat in said disc periphery for releasably arresting the jaw on said one carrier against rotation in any one of a number of predetermined angular positions; and means including a headed machine screw within said one carrier and accessible from the outside thereof for moving said wedge into and from engagement with any one of said flats on said disc periphery on turning said screw in opposite directions, respectively.

6. A chuck of the indexing type, comprising a body having a longitudinal axis; diametrically opposite jaw carriers on said body movable toward and away from each other, said body haivng aligned radial guideways for slidably but non-rotatably receiving said carriers, respectively; indexing jaws mounted on said carriers, respectively, for rotation about aligned axes extending radially of said body parallel to and centrally within the confines of said guideways; a disc turnable with a first jaw on one of said carriers and having in its periphery angularly spaced flats; a wedge mounted on said one carrier for rectilinear movement into and from engagement with any adjacent flat in said disc periphery for releasably locking said first jaw in different angular positions to said one carrier; and operating means on said body operatively connected with said carriers for forcing the jaws thereon into gripping engagement with work.

7. A chuck of the indexing type as set forth in claim 6, in which said disc is journalled with its periphery in said one carrier.

8. A chuck of the indexing type as set forth in claim 6, in which said disc is located, and said wedge is movably mounted, in said one carrier, and there is further provided means within said one carrier and accessible for operation from the outside thereof for moving said wedge into and from engagement with any of said flats on said disc periphery.

9. A chuck of the indexing type as set forth in claim 6, in which said disc is located, and said wedge is movably mounted, in said one carrier, and there is further provided means including a headed machine screw within said one carrier and accessible from the outside thereof for moving said wedge into and from engagement with any of said flats on said disc periphery on turning said screw in opposite directions, respectively.

10. In a chuck of the indexing type, the combination of a body having a longitudinal axis and a radial guideway; a jaw carrier slidably but non-rotatably received in said guideway; an indexing jaw mounted on said carrier for rotation about an axis extending radially of said body parallel to and centrally within the confines of said guideway; a disc journalled with its periphery in said carrier and turnable with the jaw thereon and having in its periphery angularly spaced flats; a plane surface in said carrier spaced from and facing the periphery of said disc; a wedge guided in said carrier for movement on said plane surface into and from engagement with any adjacent flat in said disc periphery for releasably arresting said jaw in any one of a number of predetermined angular positions; means for moving said carrier in its guideway; and a device in said carrier accessible for operation from the outside thereof for moving said wedge.

11. The combination in a chuck of the indexing type as set forth in claim 10, in which said device comprises a pivoted bell-crank lever in said carrier having two arms, a machine screw rotatably but axially immovably mounted in said carrier and having at one end a head accessible from the outside of said carrier, a slide nonrotatably mounted in said carrier for rectilinear movement and threadedly connected with said screw so as to be moved on turning the latter, said slide being operatively connected with one arm of said lever and the other arm thereof being operatively connected with said wedge for moving the latter on turning said screw.

12. In a chuck of the indexing type having rotary jaws mounted on non-rotatable opposite carriers on a chuck body of which at least one carrier is movable toward and away from the other carrier, the combination of angularly spaced flats on the jaw associated with said one carrier, said flats being equally spaced from the rotary axis of said associated jaw and extending in planes transverse to a plane at right angles to said rotary axis; a wedge guided by said one carrier for rectilinear movement into and from engagement with any adjacent flat on said associated jaw for releasably locking the latter to said one carrier against rotation thereon in any one of a number of predetermined angular positions; and means for moving said wedge into and from engagement with any adjacent flat.

References Cited in the file of this patent

UNITED STATES PATENTS

| | | |
|---|---|---|
| 546,439 | Tucker | Sept. 17, 1895 |
| 1,801,602 | Hunziker | Apr. 21, 1931 |
| 1,820,812 | Longnecker et al. | Aug. 25, 1931 |
| 2,278,651 | Eberhardt | Apr. 7, 1942 |
| 2,362,071 | Hunziker | Nov. 7, 1944 |
| 2,653,820 | Schade | Sept. 29, 1953 |

OTHER REFERENCES

"Automatic Magnetic Lathe Dog" (Schaffner) in Popular Mechanics, May 4, 1912, page 740.